United States Patent [19]

Michalek et al.

[11] Patent Number: 5,269,895
[45] Date of Patent: Dec. 14, 1993

[54] METHOD OF MAKING COMPOSITE STRUCTURE WITH SINGLE DOMAIN MAGNETIC ELEMENT

[75] Inventors: Paul F. Michalek, Bloomington; John Kirchberg, Burnsville; John A. Rice, Long Lake, all of Minn.

[73] Assignee: North American Philips Corporation, New York, N.Y.

[21] Appl. No.: 801,241

[22] Filed: Dec. 3, 1991

Related U.S. Application Data

[63] Continuation-in-part of Ser. No. 703,539, May 21, 1991.

[51] Int. Cl.⁵ .................. C23C 14/34; G11B 5/127
[52] U.S. Cl. ................... 204/192.22; 29/603; 204/192.23; 427/129; 427/131
[58] Field of Search .............. 204/192.22, 192.23; 427/129, 131; 29/603

[56] References Cited

U.S. PATENT DOCUMENTS

| 4,642,162 | 2/1987 | Brownell et al. | 156/643 |
| 4,841,624 | 6/1989 | Togawa et al. | 29/603 |
| 5,068,959 | 12/1991 | Sidman | 29/603 |

FOREIGN PATENT DOCUMENTS 61-000908  9/1986  Japan.

OTHER PUBLICATIONS

T. N. Kennedy, *J. Vac. Sci. Technol.*, vol. 13, No. 6, Nov.-Dec. 1976, pp. 1135-1137.

Primary Examiner—Aaron Weisstuch
Attorney, Agent, or Firm—John C. Fox

[57] ABSTRACT

A surface smooth enough to allow the formation thereon of a single domain magnetic element is obtained by covering a polished layer with a thin layer of the same material, to smooth sharp edges and corners. The resulting structure is useful in thin film magnetic heads.

15 Claims, 2 Drawing Sheets

METHOD OF MAKING COMPOSITE STRUCTURE WITH SINGLE DOMAIN MAGNETIC ELEMENT

CROSS REFERENCE TO RELATED APPLICATIONS

This application is a continuation-in-part of U.S. patent application Ser. No. 703,539, filed May 21, 1991.

BACKGROUND OF THE INVENTION

This invention relates to thin film magnetic heads, and more particularly relates to a composite structure including a substantially single domain magnetic element, a method of producing such a structure and thin film magnetic heads incorporating such a structure.

Thin film magnetic heads are being developed which offer the advantages of miniaturization and integration on a single substrate. In the case of magnetic tape, information is written onto, and read from, spaced, parallel tracks on the tape. To increase information density, the width of the tracks, as well as the spacing between the tracks, can be reduced. For example, in the newly proposed format for digital (audio) compact cassettes (dcc), there are a total of 18 separate, parallel tracks on a tape having the same width as the conventional compact cassette.

In order to achieve magnetic heads having correspondingly small dimensions, such heads are now being developed using thin film processing techniques of the type used to manufacture integrated circuits in silicon substrates.

In order to achieve track alignment between the read and write magnetic heads, it has been proposed that the read and write heads be integrally combined in a unitary structure. See, for example, parent U.S. patent application Ser. No. 703,539 (PHA 21,669), filed May 21, 1991, and assigned to the present Assignee, in which a combined read/write magnetic head is disclosed in which the read head includes a magnetoresistive element (MRE) overlying a substrate of substantially magnetically impermeable material, a broken (discontinuous) flux guide overlying the MRE and a continuous flux guide overlying the broken flux guide. The write head of the combined read/write magnetic head overlies the read head and shares the continuous flux guide with the read head, the continuous flux guide serving as a bottom pole of the write head. Significantly, the dimensions of the various elements of the combined read/write magnetic head are chosen so that relatively little magnetic flux produced by the write head during writing, or entering the write head during reading, is communicated via the shared flux guide to the MRE.

The successful operation of such a device depends on the MRE of the read head being a substantially single domain element. The ability to deposit such an element requires a smooth, preferably stress-free substrate surface. Otherwise, surface irregularities can form pinning sites for the formation of domain wall boundaries.

In U.S. Pat. No. 4,608,293, a magnetic layer is formed on an insulating oxide layer after the surface of the oxide layer has been carefully polished under pressure using a rotating polisher in a suspension in pure water of $MgO$, $SiO_2$, or $Al_2O_3$ powder or a mixture thereof having a particle diameter not exceeding 0.1 micron.

However, such a polishing techinque leaves surface scratches which can act as pinning sites for the formation of domain wall boundaries.

OBJECTS AND SUMMARY OF THE INVENTION

Accordingly, it is an object of the invention to provide a method for producing a thin film magnetic head including a substantially single domain magnetic element, which method does not depend upon a carefully controlled polishing of the surface upon which the element is to be formed.

It is another object of the invention to provide a method of producing a composite layer of an insulating material having sufficient surface smoothness to allow the deposition of a substantially single domain magnetic element.

In accordance with the invention, a method of producing a composite structure including a single domain magnetic element comprises the steps of: depositing a relatively thick layer of an insulating material onto a substrate; followed by depositing a relatively thin layer of the same material onto the relatively thick layer. The ratio of layer thicknesses may, for example, be in the range of about 8 to 40. The purpose of the relatively thin layer is to conform to and smooth out surface irregularities in the surface of the relatively thick layer, and thereby produce a surface of sufficient smoothness to support the formation of a substantially single domain element such as an MRE.

For example, where the surface of the relatively thick layer has indentations with sharp edges and/or corners, such as might be formed during conventional mechanical lapping or polishing techniques, the relatively thin layer conforms to and smooths out these sharp edges and corners, which could otherwise form pinning sites for domain walls during the subsequent deposition of the magnetic element, leading to a multi-domain structure. Preferably, the thickness of the relatively thin layer is in the range of from about 2 to 10 times the average depth of the surface indentations.

Selection of the same material for both the thick and the thin layer insures to a large extent chemical and physical compatibility, and consequently promotes an adherent, yet stress-free bond between the layers. Preferably, the layers are both deposited by the same technique, thereby further promoting such compatibility.

BRIEF DESCRIPTION OF THE DRAWING

The invention will be described with reference to the accompanying drawing, in which.

DETAILED DESCRIPTION OF THE PREFERRED EMBODIMENTS

Figure 1:
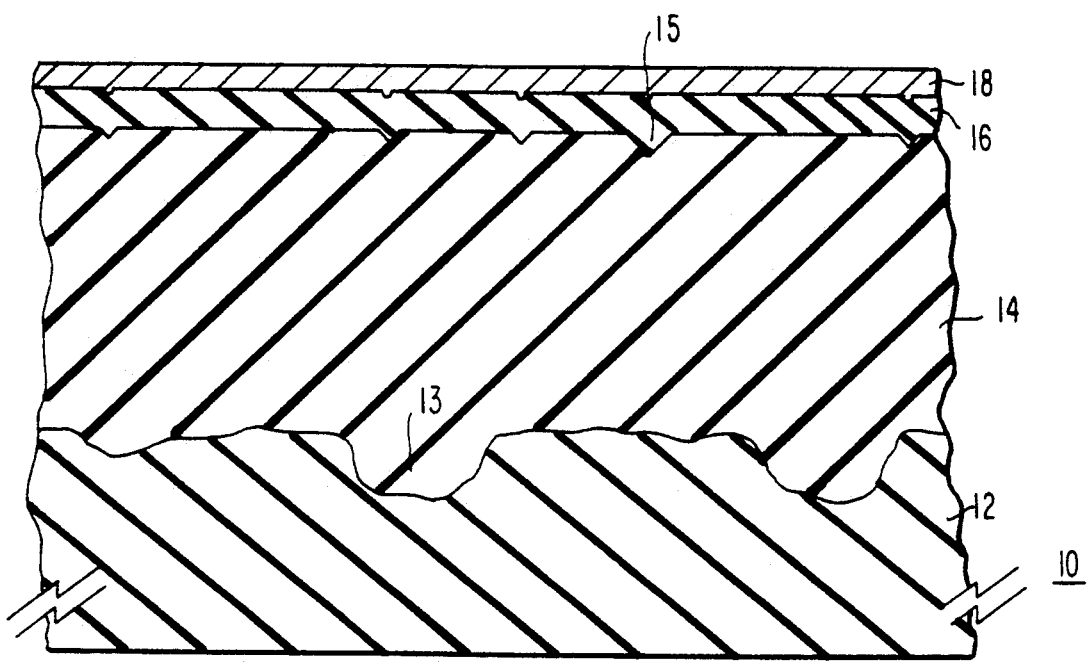
FIG. 1 is a diagrammatic cross sectional view of a portion of a composite structure, produced in accordance with the method of the invention, including a substrate and a composite insulating layer supporting a substantially single domain magnetic element.

With reference to FIG. 1, a portion 10 of a composite structure of the present invention includes a substrate 12 of substantially magnetically impermeable material, such as the material sold under the tradename Alsimag by 3M of Minneapolis. (For purposes of the present invention, a material is substantially magnetically impermeable if its permeability is less than about 2.) As is known, the composition of Alsimag includes TiC as well as $Al_2O_3$, and has the nominal composition in weight percent: 70 $Al_2O_3$, 30 TiC. The actual composition generally falls within the range 63–70 $Al_2O_3$, 27–30 TiC, up to 5 $ZrO_2$, with the remainder being made up of minor impurities, such as Mg, Ca, Fe, Co, Ni, W, Mo, and $Y_2O_3$.

When purchased, the surface of an Alsimag substrate is usually nonplanar, i.e., the surface typically includes 5 micrometer (μm)-deep concavities 13, called "pullouts". In order to provide a substantially planar surface on which to deposit the single domain magnetic element 18, and to provide electrical insulation between element 18 and the Alsimag substrate 12, a relatively thick layer 14 of electrically insulating and substantially magnetically impermeable material, such as a layer of $Al_2O_3$, is deposited, e.g., sputter deposited, onto the Alsimag substrate. (A material is electrically insulating, for purposes of the present invention, if its resistivity is greater than about $10^6$ μΩ-cm.) The initial thickness of the layer 14 is 14–20 μms.

After being deposited, the surface of the layer 14 is polished to achieve a relatively smooth surface on which to deposit the element 18. The resulting thickness of the layer 14 is 8–15 μms. In a typical polishing technique, a two stage planetary process is used, in which the surface is given a rough lap and a finish lap. About 80 percent of the material removed by lapping from the layer is achieved by rough lapping, and the final 20 percent by finish lapping. By way of example, the substrate with a 20 μm thick layer of $Al_2O_3$ is mounted on a fixture, and the fixture is rotated about its axis while bringing the surface of the layer into contact with a 40 inch diameter lapping wheel, which is also rotating on its axis. In the first stage, the polishing compound is 6 μm diamond particles, and the wheel is a copper alloy. In this stage, the thickness of the layer is reduced from 20 μ to about 14 μm. In the second stage, the polishing compound is 1 μm $Al_2O_3$ and the wheel is a fabric pad. In this stage, the thickness of the layer is reduced to 12 microns. Unfortunately, such conventional polishing techniques usually leave 0.5 μm—deep, sharp-cornered scratches (indentation) 15 in the surface of the layer 14, which are undesirable because the sharp corners serve as pinning sites for magnetic domain walls, resulting in a multi domain element 18. To smooth out the sharp corners, a relatively thin layer 16, e.g., from 0.75 to 1.5 μm in thickness, of $Al_2O_3$, is deposited, preferably sputter deposited, onto the layer 14. Layers 14 and 16 together comprise a composite insulating layer of the invention.

A substantially single domain MRE 18 of magnetically permeable material, such as permalloy, is deposited directly on the layer 16. (A magnetically permeable material, for purposes of the present invention, is one having a permeability equal to or greater than about 100. In addition, a substantially single domain MRE, for purposes of the present invention, is one which has no domains in the active area. By contrast, a destabilized or multi-domain MRE, for purposes of the present invention, is one which has domains in the active area.) If the MRE 18 is of permalloy, then the composition of the permalloy is, for example, 18–22 percent Fe and 82–78 percent Ni. The MRE 18 is readily deposited, in the form of a substantially single-domain element, onto the layer 16 using conventional techniques, such as the magnetron sputter deposition technique. Layer 18 completes the composite structure 10 in accordance with the invention.

Figure 2:
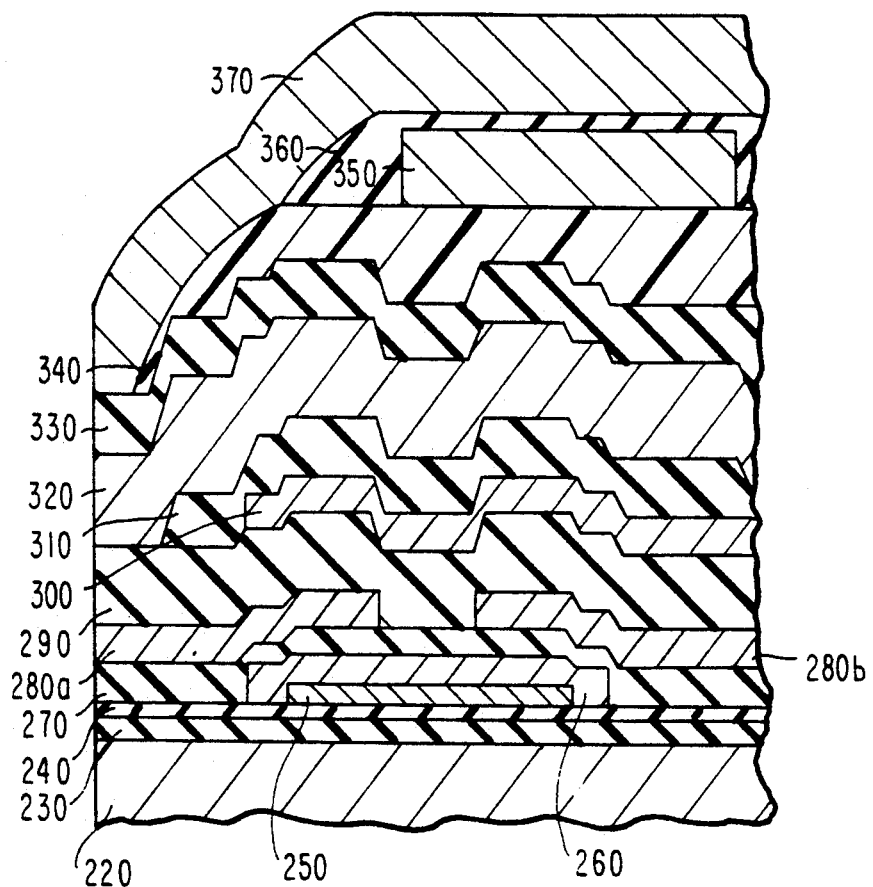
FIG. 2 is a diagrammatic cross sectional view of one embodiment of a combined read/write thin film magnetic head incorporating the composite layer structure of FIG. 1.

With reference to FIG. 2, a preferred embodiment of a thin film magnetic head incorporating the composite structure of the present invention, a combined read/write head 210 includes a substrate 220, insulating layers 230 and 240, and MRE 250, corresponding to layers 12, 14, 16, and 18, respectively, of FIG. 1. In this embodiment, the thickness of the MRE 250 is between about 0.025 and 0.08 μms, preferably 0.03 to 0.035 μms.

The MRE 250 is preferably provided with a barber pole configuration of conductive strips 260, one of which is shown in FIG. 2. The conductive strips include, for example, successive layers of Mo, Au, and Mo, having thicknesses of, respectively, 0.03 μm, 0.23 μm, and 0.09 μm. The width of each conductive strip is in the range of about 2–6 μms, the spacing between successive strips is about 5–15 μms, and the angle between each conductive strip and a longitudinal direction of the MRE, along which the MRE is magnetized, is 40°–50°. The barber pole configuration is achieved by first depositing continuous layers of Mo, Au, and Mo, using conventional deposition techniques, e.g., conventional sputter deposition techniques, and then patterning the layers into a barber pole pattern using conventional etching techniques.

The barber pole produces a longitudinal aligning field coinciding with the easy axis of magnetization of the MRE, thus insuring stability of the MRE during normal operation of the combined read/write head.

Electrical insulation for the conductive strips 260 is provided by depositing a layer 270 of electrically insulating and substantially magnetically impermeable material, e.g., a layer of $Al_2O_3$, onto the conductive strips using conventional deposition techniques. The thickness of the layer 270 is about 0.3–0.6, preferably 0.35 μms.

The read head also includes a broken (discontinuous) flux guide, including flux guide sections 280a and 280b, overlying the electrically insulating layer 270. The flux guide sections are of magnetically permeable material such as permalloy, the composition being, for example, 19.2 percent Fe and 80.8 percent Ni. The flux guide sections 280a and 280b are formed, for example, by initially depositing a continuous flux guide layer and then etching away a central strip of deposited material, or by using conventional selective deposition techniques. The thickness of each flux guide section is about 0.2–3.0 μms, preferably about 0.4 μm.

As shown in FIG. 2, each of the flux guide sections 280a and 280b partially overlaps the MRE 250 in order to couple flux into the MRE.

The read head also includes a read gap defined by a layer 290 of substantially magnetically impermeable material, e.g., a layer of $Al_2O_3$, deposited onto the broken flux guide using conventional techniques. The thickness of the layer 290 is about 0.2–0.9 μms, preferably about 0.38–0.4 μms.

Preferably, the read head includes a test/biasing electrical conductor 300 overlying the read gap layer 290. (An electrical conductor, for purposes of the present invention, is a structure which includes material having an electrical resistivity equal to or less than about 100 μΩ-cm.) This conductor 300 is useful, for example, in generating magnetic fields for testing the MRE 250, and for generating a magnetic field for biasing the MRE 250, so as to linearize the signal output from the MRE. In either event, the magnetic field or fields generated by the conductor 300 are communicated to the MRE 250 via the continuous flux guide (discussed below) and broken flux guide of the read head. The test/biasing conductor 300 includes, for example, successive layers of Mo, Au, and Mo, having thicknesses of, respectively, 0.03 $\mu m$, 0.23 $\mu m$, and 0.09 $\mu m$.

Electrical insulation for the test/biasing conductor 300 is provided by depositing a layer 310 of electrically insulating and substantially magnetically impermeable material, e.g., a layer of $Al_2O_3$, onto the test/biasing conductor. The thickness of the layer 310 is about 0.3–0.9 $\mu ms$, preferably about 0.4 $\mu ms$.

The read head further includes a continuous flux guide 320, which overlies the electrically insulating layer 310. As noted, the flux guide 320 is shared by, and serves as the bottom pole of, the write head. The continuous flux guide 320 is of magnetically permeable material, such as permalloy, having a composition of, for example, 19.2 percent Fe and 80.8 percent Ni. The continuous flux guide 320 is readily deposited using conventional techniques, e.g., plating. The thickness of the continuous flux guide is about 2.0–4.0 $\mu ms$, preferably about 3.0 $\mu ms$. Although not show FIG. 2, the continuous flux guide 320 extends either into direct physical contact with, or into close proximity to, flux guide section 280b so as to provide a low reluctance path between the two flux guides.

In addition to the bottom pole (continuous flux guide) 320, the write head of the combined read/write head 210 includes an overlying layer 330 of substantially magnetically impermeable material, e.g., a layer of $Al_2O_3$, which defines the write gap of the present invention. The layer 330 has a thickness of about 0.4–1.0 $\mu m$, preferably about 0.5–0.7 $\mu m$, and is readily deposited using conventional techniques.

As shown in FIG. 2, the upper surface of the write gap layer 330 is nonplanar, which is a consequence of the nonplanarity introduced by the broken flux guide of the read head. A planarization layer 340 of substantially magnetically impermeable, electrically insulating material is deposited onto the write gap layer 330. One such useful planarization layer is of photoresist material, such as the photoresist material sold under the tradename AZ4340 by AZ HOECHST of Sommerville, N.J. The photoresist layer is readily deposited using conventional spin-deposition techniques and has a thickness of about 2–4 $\mu ms$.

An electrical conductor 350, which serves as a one-turn write coil, is readily formed on the planarization layer 340 by depositing a layer of electrically conductive material, e.g., a layer of Cu or Au, onto the planarization layer 340. The conductor 350 is readily deposited using conventional electroplating techniques and has a thickness of about 2–4 $\mu ms$.

A layer 360 of electrically insulating, substantially magnetically impermeable material is deposited onto the one-turn write coil. The layer 360 is, for example, of photoresist material, as discussed above. The thickness of the layer 360 is about 2–4 $\mu ms$.

The write head further includes a write top pole 370 directly overlying the layer 360. The top pole 370 is of magnetically permeable material, such as permalloy, the composition being, for example, 19.2 percent Fe and 80.8 percent Ni. The thickness of the top pole 370 is about 2.0–4.0 $\mu ms$, preferably about 3.0 $\mu ms$. Although not shown in FIG. 2, the right side (as viewed in FIG. 2) of the top pole 370 extends either into direct physical contact with, or into close proximity to, the bottom pole 320 so as to provide a low reluctance path between the poles.

Other embodiments and variations of thin film heads including a composite structure having a substantially single domain element such as an MRE on a composite insulating layer of the invention will become apparent to those skilled in the art and as such are intended to be encompassed within the scope of the appended claims. For example, instead to the combined read/write head described herein, the composite structure may be incorporated into a read head.

We claim:

1. A method of producing a composite structure, the structure comprising a thin film structure on a substrate, the method comprising:
   forming an insulating layer on the substrate; and
   forming a magnetic element on the insulating layer; characterized in that:
   the insulating layer is a composite layer formed by first depositing a relatively thick layer of an insulating material having surface irregularities, and then depositing a relatively thin layer of the same material on the relatively thick layer, whereby the relatively thin layer conforms to and smooths out the surface irregularities in the relatively thick layer.

2. The method of claim 1 in which the relatively thick and thin layers are deposited to achieve a ratio of thicknesses in the range of about 8 to 40.

3. The method of claim 1 in which the surface of the relatively thick layer has indentations.

4. The method of claim 3 in which the relatively thin layer is deposited to a thickness of about 2–10 times the average depth of the surface indentations.

5. The method of claim 4 in which the relatively thin layer is deposited to a thickness of from about 0.75 to 1.5 microns.

6. The method of claim 1 in which the relatively thick and thin layers are both deposited by the same technique.

7. The method of claim 6 in which the relatively thick and thin layers are both sputter deposited.

8. The method of claim 1 in which the relatively thick layer is polished prior to formation of the relatively thin layer.

9. The method of claim 8 in which polishing is accomplished by mechanical lapping.

10. The method of claim 1 in which the insulating material is $Al_2O_3$.

11. The method of claim 1 in which the substrate is non-magnetic.

12. The method of claim 11 in which the non-magnetic substrate comprises TiC as a major component, and $Al_2O_3$, $SiO_2$, and MgO as minor components.

13. The method of claim 12 in which the composition of the substrate in weight percent comprises from 63–70 $Al_2O_3$ and 27–37 of TiC.

14. The method of claim 1 in which the substrate is polished prior to formation of the relatively thick layer.

15. The method of claim 1 comprising the additional steps of:
   (a) forming a magnetic element on the composite layer;
   (b) forming a second insulating layer on the magnetic element;
   (c) forming a lower flux guide on the second insulating layer, the lower flux guide consisting of two sections, a forward section and a rear section, the sections laterally spaced apart, and extending forward and rearward from locations overlying end portions of the magnetic element, the lower flux guide sections and the magnetic element defining a first flux path;

(d) forming a third insulating layer on the lower flux guide;

(e) forming an upper flux guide on the third insulating layer, the upper flux guide defining a second flux path;

thereby forming a thin film magnetic read head.

* * * * *